May 19, 1953
W. E. EDWARDS
2,639,000
ROTATING BED ADSORBER
Filed June 12, 1951
2 Sheets-Sheet 2
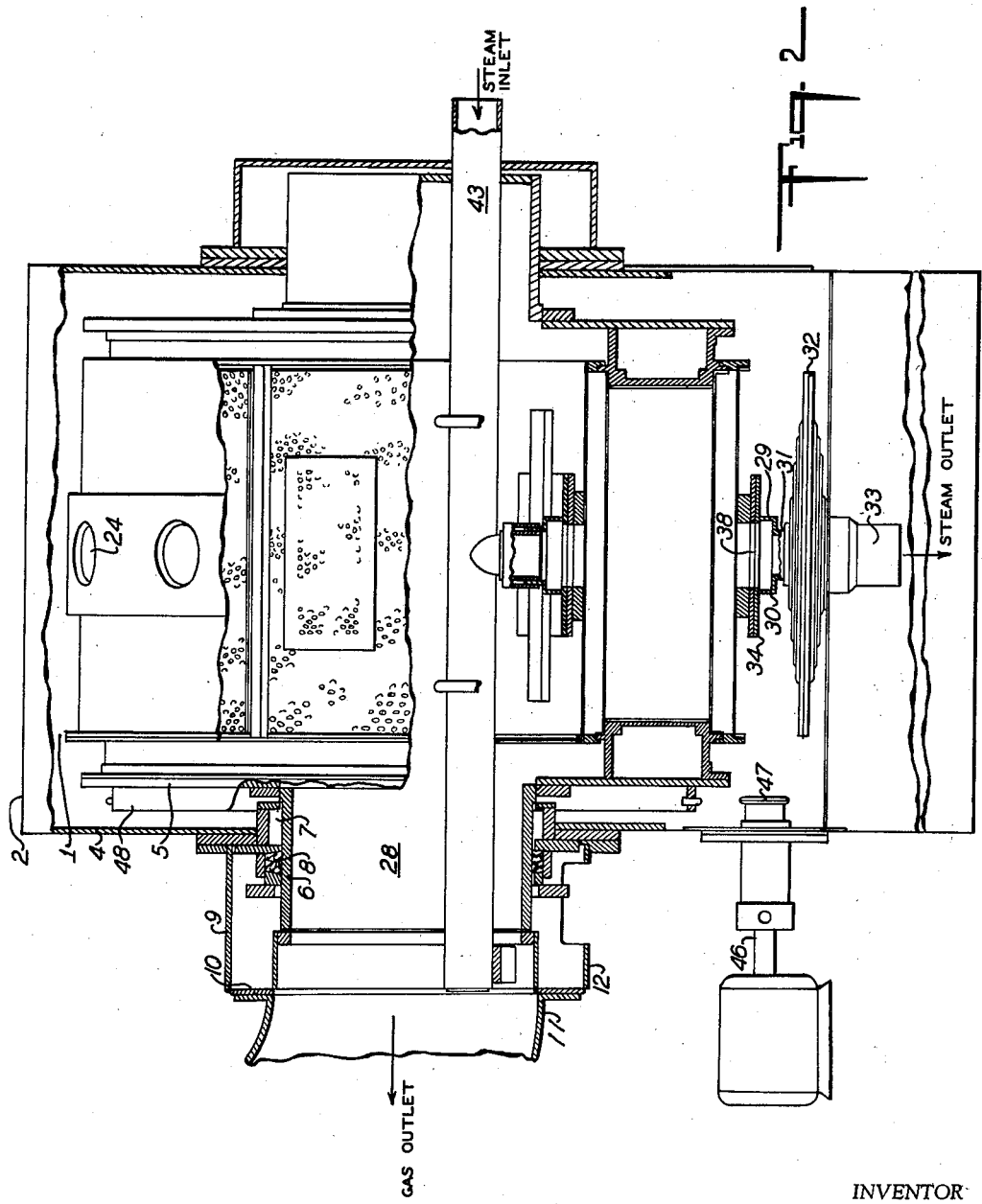
INVENTOR
WILLIAM ERNEST EDWARDS
BY Morgan, Finnegan & Durham
ATTORNEYS.

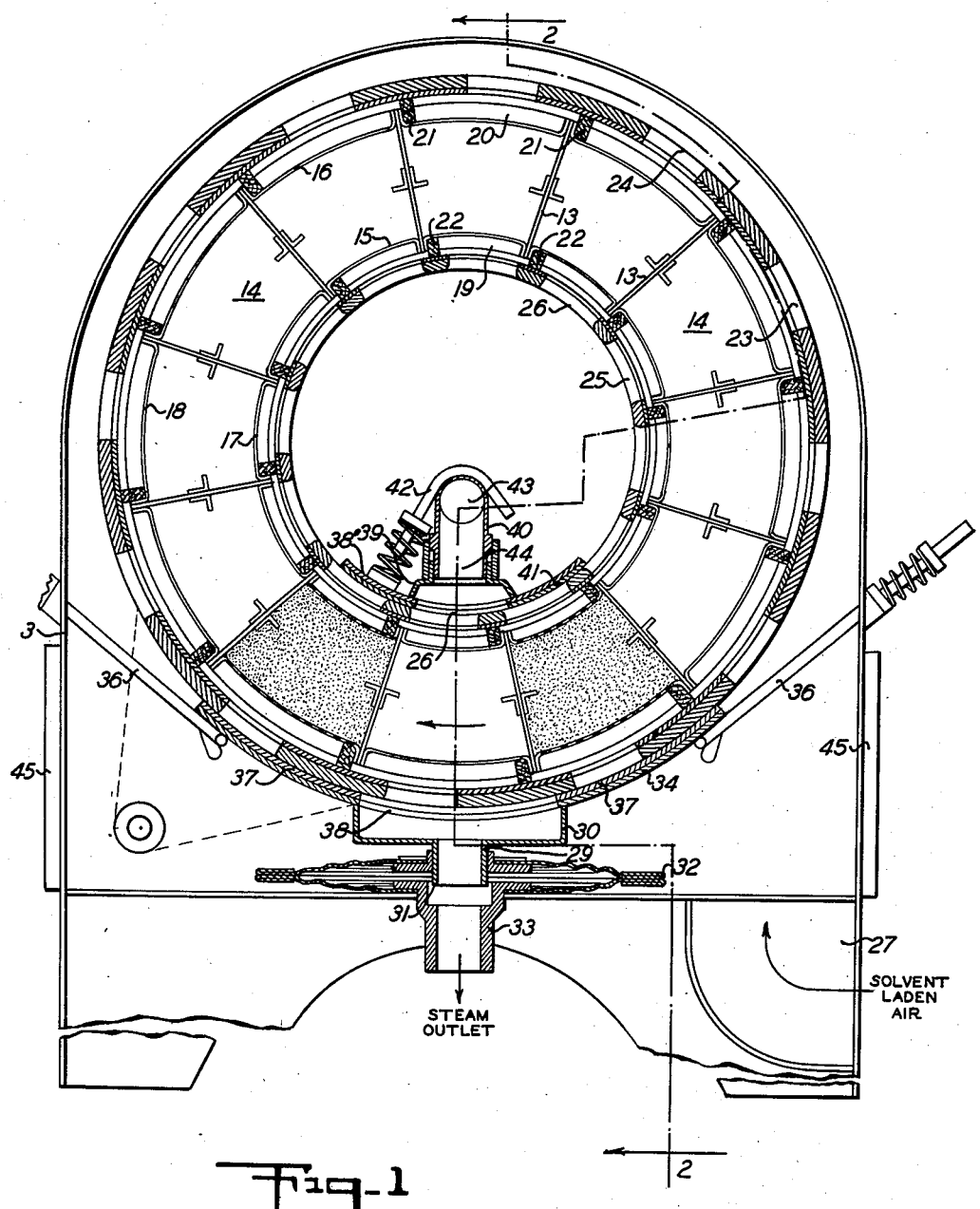

Patented May 19, 1953

2,639,000

UNITED STATES PATENT OFFICE 2,639,000

ROTATING BED ADSORBER

William E. Edwards, Leigh, England, assignor to Sutcliffe Speakman & Company Limited, Leigh, England, a British company Application June 12, 1951, Serial No. 235,212
In Great Britain March 1, 1950

1 Claim. (Cl. 183—4.6)

The invention relates to adsorbing, and apparatus therefor, and particularly to an apparatus for continuously adsorbing and recovering solvent vapours by the use of activated carbon, but is applicable to other purposes such as to the drying of air or other gases by the use of other solid adsorbents.

In known processes it has hitherto been necessary to close down the adsorber when the adsorbent became saturated with solvent, or like substance, and to switch over to another adsorber. This not only involved the expense of operating at least two adsorbers in a larger space, but was also wasteful of time. Furthermore, it involved the use of valves which are liable to stick. A further disadvantage was that to recover the solvent from the mixture of solvent and steam it was necessary to provide additional plant, such as condensers with water circuits, liquor storage tanks and the like, as required, for pumping mother liquor into the still itself.

The invention has among its objects to provide an adsorber operating to recover the solvent by adsorption with active carbon or like adsorbent, in which both the adsorption of solvent vapours from air or other carrier, and the steaming of the adsorbent for the recovery of the solvent, and where the adsorbent is activated carbon, for the reactivation of the carbon are carried out simultaneously, or continuously in a single unit.

According to the invention, the adsorbent substance is maintained continuously in motion during adsorption, successive parts of the adsorbent being isolated for steaming during the continuous adsorption operation.

According to the invention furthermore, the adsorber comprises an inner annular drum, closed at the ends and horizontally mounted to rotate slowly in trunnions in bearings provided in the open unsealed ends of an outer stationary casing with seals provided between the trunnions and the open ends of the outer stationary casing, the inner annular drum being divided by radial partitions into compartments which are packed with activated carbon, or like adsorbing material, and solvent vapour laden air being passed into the stationary casing to pass through the walls of the drum from the outside inwardly, so that the vapour laden air is stripped of solvent by the adsorbent and passes out centrally of the inner drum.

According to the invention furthermore, means are provided to seal-off one or more of the compartments containing the adsorbent while the drum is rotating, so that at a determined position or determined positions, steam may be passed through the adsorbent in the sealed-off compartment, to desorb the solvent contained in the carbon, and also to reactivate the carbon, the solvent vapour and steam, if desired, being then passed away to be condensed, or fractionally distilled, in any convenient manner.

According to the invention furthermore, means may be provided, at predetermined positions during the rotation of the inner annular drum, to pass drying and/or cooling air through the carbon after the steaming stage.

Where silica gel or other solid adsorbents are used, the apparatus according to the invention may be used for drying air or other gases, and furthermore, the adsorbent itself may be dried by passing hot air or other gas, in place of steam, through the adsorbent.

According to the invention moreover, a part of the air stripped from solvent may be recycled through the apparatus to ensure that the adsorbent is fully saturated before steaming.

The invention is diagrammatically illustrated by way of example, in the accompanying drawings, in which:

Figure 1 is a sectional end elevation of an adsorber constructed according to the invention, and Figure 2 is a corresponding side elevation partly in section.

In carrying the invention into effect according to the construction illustrated in the drawings, an annular drum 1 is horizontally mounted within an outer closed stationary casing 2 of a shape to conform to the drum 1, and with vertical sides 3 and flat ends 4. The drum 1 is provided to be rotatable at a slow speed—if desired, by hand rotation—within the outer casing 2 and is provided with annular end plates 5. Coaxial central holes are provided in the outer casing 2 to receive trunnion ends 6 which are mounted on roller bearings 7 provided in the coaxial holes in the outer casing 2. Gland and stuffing box seals 8 are provided between the trunnion ends 6 and annular extensions 9 of the casing 2, so that the annulus is sealed around the outer surface, but is open at the inner peripheral face through the trunnion ends. The trunnion ends are closed by a plate 10 at one end, and to the other end through an annular end fitting 12 is connected an air duct 11 for a purpose hereinafter described.

The annular drum 1 is divided by radial partition members 13 extending the length of the drum into a number of compartments 14—say twelve.

The inner and outer limits of each compartment are determined respectively by inner and outer arcuate perforated plates or screens 15, 16 respectively of a mesh to retain between them the activated carbon in comminuted form which is the adsorbent used for the recovery of the solvent.

The annular drum 1 is mounted between an inner metal cylinder 17 and an outer metal cylinder 18. The cylinders 17 and 18 are secured at their ends to the end plates 5, and rotate with the drum 1. Inner spaces 19 and outer spaces 20 are left respectively between the inner and outer screens 15 and 16 and the inner and outer metal cylinders 17 and 18.

The partitions 13 are sealed off one from another at the top and bottom by means of longitudinal outer packer strips 21 and inner packer strips 22 respectively, both of substantially rectangular section, the strips extending the length of the drum 1 and being secured in the angles formed by the upturned ends of the screens 15, 16 fitted between the respective ends of the adjacent partitions 13, the longitudinal edges of the outer strips 21 projecting outwardly beyond the outer ends of the partitions 13 and the longitudinal edges of the inner strips 22 projecting inwardly beyond the inner ends of the partitions, to bear on the inner peripheral surfaces respectively of the inner and outer metal cylinders 17 and 18. The compartments 14 are thus sealed-off from each other during rotation of the annular drum 1 except at the inner peripheral surfaces.

At a middle position of the outer metal cylinder 18 there is secured as by welding, or in any other comparable manner, to secure an effective seal, a relatively narrow metal band or hoop 23 surrounding the cylinder 18 and machined smooth and truly cylindrical on its outer exposed surface. Provided in the band or hoop 23 and extending at coincident positions through the metal cylinder 18 are port holes 24, corresponding in number to the compartments of the annular drum 1 and equally spaced apart. Each of the port holes 24 opens into one of the outer spaces 20—above the outer screen 16—at a corresponding position, on the inner periphery of the inner metal cylinder 17. In the same plane as the band or hoop 23 is a metal band or hoop 25 of the same width as the band or hoop 23 and fitting closely to the inner metal cylinder 17, on which it is mounted. Port holes 26 are provided in spaced relation to pass at coincident positions through the band or hoop 23 and the metal cylinder 17. Each set of port holes 24, 26 equals in number the number of compartments 14, one port hole being provided at the inner end and one at the outer end of each compartment.

Provided at a convenient position, advantageously in the bottom of the outer casing 2 is an inlet 27 for the air saturated with solvent. The solvent-saturated air passes into the casing 2 and through the outer port holes 24, then through the carbon-containing compartments 14, and out into the interior of the inner metal cylinder 17 through the port holes 26, the air being stripped of the solvent which is retained in the activated carbon in the annular drum 1. An outlet 28 for the air is provided in the trunnion end of the outer stationary casing 2, at the end opposite to the steam admission end.

Mounted, advantageously in the bottom of the casing 2, at a position in the middle of the casing immediately below the band or hoop 25, is an off-take pipe 29. The off-take pipe 29 is provided as a casing 30 with a bottom cylindrical outlet 31 connected through a diaphragm 32 to a socket connection 33 of the outlet pipe.

The casing 30 is connected with air-tight joint at the edges to a sliding shoe 34, which is formed with a central hole 38 to register with the outer port holes 24 in the rotation of the drum, and extending to overlap on each side of the outer periphery of the drum, so as to slide over it as the inner drum 1 rotates. The shoe 34 is held under tension in position at opposite ends in pressure contact with the band or hoop 25 by means of tensioned rods 36. Sealing material 37 is provided on the inner curved surface of the shoe 34, which material in the rotation of the inner drum 1 assumes closely the curvature of the band or hoop 25 as it beds down or wears, and thus improves the conditions for ensuring an effective steam-tight or air-tight seal between the outer surface of the band or hoop 25 as it slides over the surface of the sealing material 37.

Mounted at a middle position on the inner band or hoop 23, in the same plane as the band or hoop 25 at a position coincident with the radial axis of the off-take pipe 29, is an arcuate sliding shoe 38' of a similar form to the shoe 34 and provided with a casing 39 and intake 40 of similar form to that of the off-take pipe 29.

The shoe 38 surfaced with a sealing material 41 is held in close sliding contact with the surface of the inner band or hoop 25 so that the joint is steam-tight. The shoe 38 is held under spring pressure by means of a spring-pressed hoop 42, the two arms of which bear on the rear faces of the shoe 38.

Steam is passed to the intake 40 through a horizontally extending steam pipe 43 closed at one end and extending through the end face of the outer casing 2, into the inner metal cylinder 17, with an outlet 44 spanning the holes in the inner band or hoop 25 as they pass beneath the steam outlet. Thus steam is passed directly through the compartments beneath the steam outlet 44 as the drum rotates, and passes completely through the carbon in the compartments to be exhaused through the steam off-take pipe 29. Instead of steam, dry air or any other gaseous reagent for use in the method operated may be passed in through the steam pipe for example, for drying the carbon after steaming. Instead of, or in addition to, an inlet for heated air may be provided an inlet for cooling air.

A glass-faced inspection cover 45 may be provided in the wall of the outer stationary casing 2.

In operation, solvent laden air passes into the outer casing 2 through the inlet 27 and by way of the port-holes 24 into the outer spaces 20 and into the carbon-containing compartments 14 where the solvent is retained. The solvent-freed air then passes into the inner spaces 19 and through the port-holes 26 into the interior of the inner metal cylinder 17, whence it passes out through the air-duct 11 connected to the open trunnion end of the outer casing 2. The inner drum 2 carrying the activated carbon rotates slowly at about 2-6 revolutions per hour throughout, but it will be understood that commercially efficient operation can be carried out at speeds of rotation outside these limits.

Periodically, or continuously, as each carbon-containing compartment passes beneath the steam inlet, steam is passed through the compartments containing the active carbon from the inside outwardly, passing out through the off-take and carrying with it the solvent vapour, whence it may be carried directly to a fractionating column. The steam can be used in a normal condition of for example, at a pressure of 60–100 lbs./sq. inch either saturated or with a reasonable amount of superheat. In the adsorber the steam pressure may be from a few inches water gauge to a possible 5 lbs./sq inch.

It will be understood that not only is the solvent driven out of the carbon by the steam but the carbon itself is reactivated.

A separate inlet may be provided for hot air for drying the reactivated carbon after steaming or as hereinbefore referred to, hot air may be passed in through the steam pipe.

The inner drum may be rotated by power means, such as an electric motor, which may operate through a power shaft 46 mounted in the end plate of the outer stationary casing 2 and with a sprocket wheel 47 connected through chain gearing (not shown) to a sprocket wheel 48 formed as an annular flange projecting laterally from the end face of the inner rotating drum, 1. The inner drum may, however, be operated intermittently by hand.

The bed of carbon may be 5" or 6" or more or less in depth, and the solvent laden air may be passed in to the adsorber at a rate of 500 C. F. M., or more or less.

In an alternative construction where a second adsorber is readily available the dividing of the inner annulus into sections may be unnecessary, and after a determined period of adsorption, the valve controlling the entry of solvent laden air may be closed and the steam inlet opened. Such a construction may be used for continuous steaming. When the carbon is fully saturated, it is possible that there may be a small amount of slip towards the end of rotation, in which case it may be advantageous to recycle that part of the air issuing for example, from the last compartment of the adsorber unit, to ensure that the carbon is fully saturated before steaming.

From the above description of the apparatus according to the invention, it will immediately be appreciated by those acquainted with the art that it has many outstanding advantages over known apparatus. Thus, it provides for a continuous process of adsorbing with continuous reactivation of the carbon or other adsorbent used; only one adsorber is necessary, which involves a considerable saving in time and money; there are no valves to operate; the capacity of the unit, so far as adsorption and recovery are concerned depend only on the rate of rotation of the annulus or inner drum containing the carbon and the equivalent rate of steam flow into the adsorber; by rotating the carbon bed, adsorption is effected more efficiently and more evenly than with a static bed; as the process is continuous there is complete regularity of both steam and water supply, and as there are no peak demands, the total consumption will be less; finally, in the recovery of an immiscible solvent, that is to say, a solvent which is immiscible in water, the adsorber itself may be connected directly to a fractionating column, which will obviate the necessity for intermediate plant, for example, condensers, liquor storage tanks and the like.

I claim:

In that apparatus for the recovery of a liquid of the nature of a solvent from a mixture of such liquid with a gas wherein an outer gas-tight casing surrounds an annular container comprising peripherally perforate radial compartments adapted to contain an adsorbent, said container being mounted for rotation therein to connect said compartments with adsorption and regeneration stations, wherein means are provided for passing solvent-laden gas through said compartments at an adsorption station and means are provided for passing steam through said compartments at a regeneration station, that improvement which comprises sealing means for separating said stations, said sealing means comprising auxiliary cylinders fixed surrounding the inner and outer periphery of said annular container, said cylinders being provided with spaced apertures in registry with one another and each in registry with one of said compartments, but being otherwise permanently sealed between said compartments, whereby gas is directed through the apertures to the compartments, and a pair of arcuate shoes, one of said shoes being continuously spring pressed into gas-tight sliding engagement with the inner cylinder and the other shoe being spring pressed into gas-tight sliding engagement with the outer cylinder, the inner shoe being positioned surrounding the inlet of said regeneration station and the outer shoe being positioned surrounding the outlet of said regeneration station, whereby high pressure steam may be used for continuous regeneration of only single compartments of said annular container.

W. E. EDWARDS.

References Cited in the file of this patent

UNITED STATES PATENTS

| Number | Name | Date |
| --- | --- | --- |
| 1,602,500 | Nuss | Oct. 12, 1926 |
| 2,115,226 | Kopp | Apr. 26, 1938 |
| 2,286,920 | Miller | June 16, 1942 |
| 2,507,608 | Miller | May 16, 1950 |
| 2,541,694 | Galson | Feb. 13, 1951 |

FOREIGN PATENTS

| Number | Country | Date |
| --- | --- | --- |
| 536,776 | Great Britain | May 27, 1941 |